United States Patent [19]
Shimada et al.

[11] Patent Number: 6,051,853
[45] Date of Patent: *Apr. 18, 2000

[54] SEMICONDUCTOR PRESSURE SENSOR INCLUDING REFERENCE CAPACITOR ON THE SAME SUBSTRATE

[75] Inventors: Satoshi Shimada; Akihiko Saito; Masahiro Matsumoto, all of Hitachi; Seikou Suzuki, Hitachiota; Terumi Nakazawa, Naka-machi; Atsushi Miyazaki, Mito; Norio Ichikawa, Mito; Keiji Hanzawa, Mito, all of Japan

[73] Assignees: Hitachi, Ltd.; Hitachi Car Engineering Co., Ltd., both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/943,205

[22] Filed: Oct. 3, 1997

[30] Foreign Application Priority Data

Oct. 3, 1996 [JP] Japan .................................. 8-262748
Oct. 25, 1996 [JP] Japan .................................. 8-283670

[51] Int. Cl.⁷ .................................................. H01G 7/00
[52] U.S. Cl. .......................... 257/252; 257/248; 257/249; 257/254; 257/417; 361/280; 361/283.1; 361/283.2; 361/283.4
[58] Field of Search ............................. 28/248, 249, 252; 29/594, 595, 718, 724; 361/280, 283.1, 283.3, 283.4; 257/252, 254, 417

[56] References Cited

U.S. PATENT DOCUMENTS

| 4,743,836 | 5/1988 | Grzybowski et al. | 324/60 |
| 5,431,057 | 7/1995 | Zimmer et al. | 73/724 |
| 5,444,901 | 8/1995 | Wiegand et al. | 29/595 |

FOREIGN PATENT DOCUMENTS

| 1-256177 | 10/1989 | Japan . |
| 4-143628 | 5/1992 | Japan . |
| 5-187947 | 7/1993 | Japan . |

*Primary Examiner*—Fetsum Abraham
*Attorney, Agent, or Firm*—Evenson, McKeown, Edwards & Lenahan, P.L.L.C.

[57] ABSTRACT

A semiconductor pressure sensor utilizing electrostatic capacitance has a plurality of pressure sensing electrostatic capacitances and a reference electrostatic capacitance formed on one side of a silicon chip. As a movable electrode, the pressure sensing electrostatic capacitances each have a diaphragm, which may have a displacement portion composed of a central area thereof, and a peripheral portion which is more deformable than the central portion.

27 Claims, 9 Drawing Sheets

FIG.5A — FORMING CMOS CIRCUIT

FIG.5B — FORMING SACRIFICE FILM (SiO2)

FIG.5C — FORMING POLYSILICONE FILM

FIG.5D — REMOVING SACRIFICE FILM (SiO2)

FIG.5E — FILLING HOLE

FIG.5F — FORMING Al ELECTRODE

SEMICONDUCTOR PRESSURE SENSOR INCLUDING REFERENCE CAPACITOR ON THE SAME SUBSTRATE

BACKGROUND AND SUMMARY OF THE INVENTION

This application claims the priority of Japanese Application No. 8-262748, filed Oct. 3, 1996, and Japanese Application No. 8-283670, filed Oct. 26, 1996, the disclosures of which are expressly incorporated by reference herein.

The present invention relates to a semiconductor type sensor for detecting a pressure as a change in electrostatic capacitance and, more particularly, to a surface device type complex sensor which has sensors formed entirely on the same surface of a silicon chip.

As disclosed in Japanese patent document JP A No. 1-256177, a conventional complex sensor is a bulk type piezo-resistance sensor in which a differential pressure sensor, a static pressure sensor and a temperature sensor are formed on a single substrate, which is worked from the backside surface into a diaphragm.

In the conventional complex sensor of bulk type, since the silicon substrate is worked from the backside surface into a diaphragm, the position of the diaphragm is apt to deviate slightly from the sensing elements formed on the front surface of the silicon substrate. The sensitivity of the sensor would be substantially reduced even if there is a small deviation in the relative position. Therefore, in order to avoid this problem, it has been necessary to design the diaphragm on a relatively large scale. This is because positioning accuracy of the process for forming the sensors on both sides of the silicon wafer is lower than positioning accuracy for the formation of sensors on only one side of the substrate.

In addition, the conventional complex sensor has a high manufacturing cost because the silicon wafer must be mirror-finished on the both surfaces. Further, the piezo-resistance type sensor has a non-linear characteristic, and accordingly varies significantly with change in environmental temperature. Therefore, characteristic compensation of the sensor becomes more difficult, and the cost increases.

Japanese patent document JP A 4-143628 discloses electrostatic capacitance type pressure sensors each utilizing a silicon tip. However, it does not disclose any pressure sensors in which multi-function sensor portions are formed on only one side.

Japanese patent document JP A 5-187947 also discloses electrostatic capacitance type pressure sensors each utilizing a silicon chip. However, it does not disclose any pressure sensors each of which has pressure portions formed on only one side.

Further, conventional electrostatic capacitances or sensors are known which comprises a movable electrode of a flat member, a fixed electrode, an insulating film and a support for supporting the movable electrode to provide a gap between the movable electrode and fixed electrode. When a pressure is applied on the movable electrode, the movable electrode deflects so that displacement of the movable electrode is greatest at the center and is smaller toward the periphery. Therefore, the relationship of the electrostatic capacitance to the pressure is non-linear, and the non-linearity causes output errors.

SUMMARY OF THE INVENTION

An object of the present invention is to provide a complex sensor which is small in size and low in cost.

Another object of the present invention is to provide such a sensor which is simple in structure and in manufacturing method, suitable for mass-production and economical.

Still another object of the present invention is to provide a multi-function pressure sensor having a plurality of sensors and a plurality of signal processing circuits on a single chip.

A further object of the present invention is to provide an IC pressure sensor which is highly sensitive and less-affected by environmental temperature.

A still further object of the present invention is to provide a high-pressure-resistant complex sensor.

A still further object of the present invention is to provide a high-precision sensor of reduced non-linearity.

The objects of small size and low cost can be achieved by an electrostatic capacitance type sensor which is simple in structure and in manufacturing method and is manufactured by forming a multi-layered film on only one side of a silicon wafer, by means of a surface processing technology. Initially, a conductive film which serves as a sensor diaphragm and an insulator film (sacrifice film) are formed, and the sacrifice film is then removed to form a space, so that an electrostatic capacitance is formed between the diaphragm and a fixed electrode formed in the substrate side of a silicon wafer. In order to attain the object of mass-production, a silicon wafer of the standard specification for an LSI is used, and then sensors and signal processing circuits are formed on one side of the silicon wafer, by means of a semiconductor fabrication process.

The object of multi-function can be attained by providing a multi-function pressure sensor which is manufactured by forming two absolute pressure sensing electrostatic capacitances as a complex on a single chip. One of the pressure sensing electrostatic capacitances is then used as a sensor for measuring absolute pressure, while the other is used as a sensor for measuring atmospheric pressure. Together these two sensors serve as a relative pressure sensor, by taking the difference of their outputs.

In order to attain the object of high sensitivity and reduced temperature effect, floating capacitance produced by signal lead wires is reduced substantially by forming the signal processing circuits for calculating output signals of the complex sensor near the sensor capacitances. Further, a reference capacitance, which is formed at the same time as the two electrostatic capacitance type sensors that are formed on one side of the silicon substrate, has a temperature coefficient nearly the same value as the sensors. Thus, it is possible to obtain a pressure sensor having less temperature effect by differencing the both signals. Furthermore, since a signal from the reference capacitance does not vary with pressure, the reference capacitance can function as a temperature sensor by itself.

In order to attain the ability to withstand high-pressure, a multi-layered film is formed on the substrate surface of the silicon wafer, with a gap of several microns under the surface layer. With such an arrangement, the diaphragm is deformed and brought in contact with the substrate surface of the silicon wafer, thus restricting excessive deformation of the diaphragm and preventing rupture of the diaphragm when an over-load pressure is applied. Therefore, the sensor can withstand a pressure which is several tens of times as high as measuring range pressure.

Other objects, advantages and novel features of the present invention will become apparent from the following detailed description of the invention when considered in conjunction with the accompanying drawings.

DETAILED DESCRIPTION OF THE PREFERRED EMBODIMENTS

Firstly, a semiconductor pressure sensor according to the present invention will be described hereunder.

The diaphragm formed on one side of the silicon chip is an electrically conductive film which acts as the movable film, and is moved according to a pressure loaded thereon. The space formed by removing the insulator film (sacrifice film) gives rise to the pressure sensing electrostatic capacitance between the diaphragm and the fixed electrode formed in the substrate side of the wafer. The space is hermetically sealed and evacuated to provide a vacuum, and functions as a reference pressure chamber. Thus, the space creates an electrostatic capacitance type pressure sensor which senses pressure on the basis of absolute pressure. The diaphragm is displaced downward and becomes concave when it is exposed to atmospheric pressure, and is returned to a flat-shape as the load pressure approaches vacuum pressure. When the load pressure is a positive pressure relative to atmospheric pressure, the diaphragm is displaced farther downward and accordingly the width of the space between the diaphragm and the fixed electrode becomes smaller.

As described above, the electrostatic capacitance formed with the fixed electrode is varied by the load pressure. This electrostatic capacitance change is converted into a standardized output signal within a range of, for example, 1V to 5V by the signal processing circuit, and the loaded pressure is detected from this value.

In order to provide a relative pressure signal, two pressure sensing electrostatic capacitances having the structure of absolute pressure reference can be formed as a complex on the single chip. A pressure to be measured is then introduced onto one of the pressure sensing electrostatic capacitances, and atmospheric pressure is introduced onto the other. By all differencing the outputs of the two sensors using a signal processing circuit, the difference is output as a relative pressure signal. By differencing the two pressure sensing capacitances and the reference capacitance, the differences are output as signals of an absolute pressure sensor and an atmospheric pressure sensor.

A gap of several microns is formed under the surface layer, and the diaphragm is deformed and brought in contact with the substrate surface of the silicon wafer to prevent excessive deformation of the diaphragm, and to prevent rupture of the diaphragm when an over-load pressure is applied. Therefore, the sensor can withstand a pressure which is several ten of times as high as the measurement range pressure.

Figure 1A:
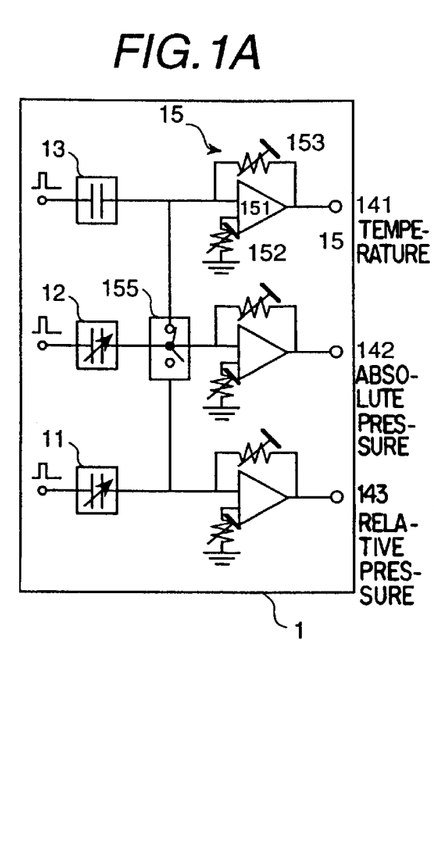
FIGS. 1A to 1C are block circuit diagrams showing various embodiments of sensors in accordance with the present invention.
Figure 1B:
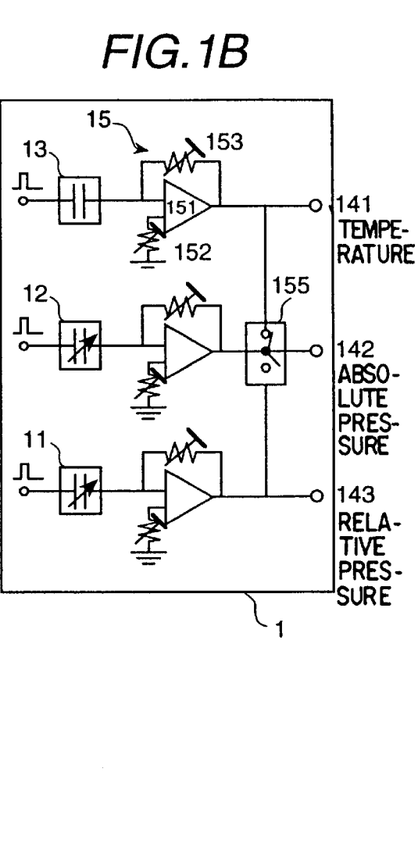
Figure 1C:
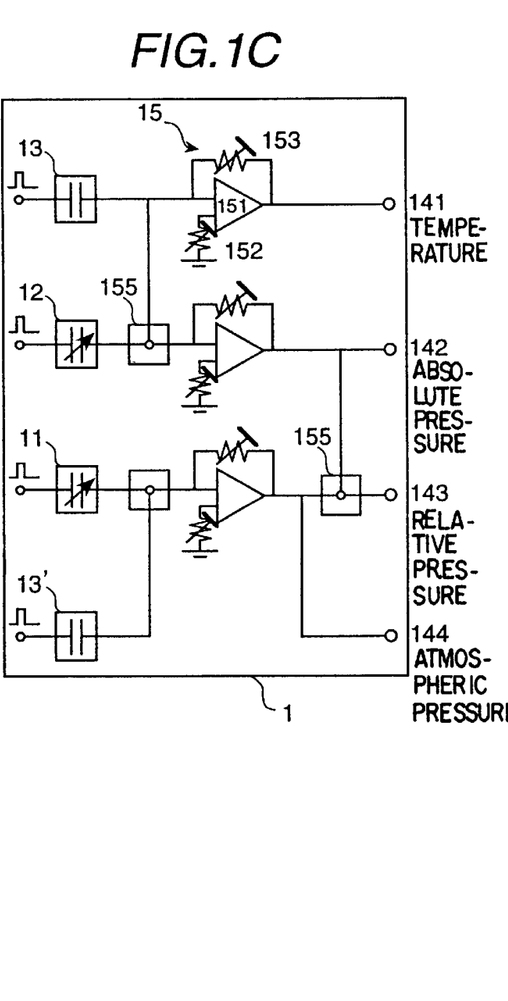

Referring to FIGS. 1A to 1C, embodiments of the present invention will now be explained.

FIG. 1A is a block circuit diagram showing an embodiment of a semiconductor pressure sensor in accordance with the present invention.

In FIG. 1A, the pressure sensor comprises three capacitances 11, 12 and 13, and a signal processing circuit 15, which are formed as a complex on a sensor substrate. Two of the three capacitances are pressure sensing capacitances 11, 12 to detect a pressure by means of electrostatic capacitance changes, and generate output signals indicative thereof; one of them is a reference or temperature sensing capacitance 13 which can detect a temperature as an electrostatic capacitance change, and output a signal. The signals from the pressure sensing capacitances 11, 12 are processed by the signal processing circuit 15 including signal amplifiers 151 with adjustable resistors 152 and 153 to output a signal on the basis of absolute pressure from a terminal 142 and a signal of relative pressure from a terminal 143.

The temperature sensing capacitance 13, which can detect a temperature as mentioned above, also can be used as a reference capacitance for removing an influence of temperature on the pressure sensing capacitances 11 and 12.

The pressure sensing capacitance 12 has a construction to sense a pressure to be measured as an absolute pressure. A signal (capacitance change value) from the pressure sensing capacitance 12 is subjected to a calculation of a difference between that signal and a signal from the reference (temperature sensing) capacitance 13 by closing a switching device 155. The difference is processed and output from the terminal 142 as an absolute pressure.

The pressure sensing capacitance 11 is constructed to sense atmospheric pressure. When a relative pressure output is desired, a difference in capacitance between this atmospheric pressure sensing capacitance 11 and the pressure sensing capacitance 12 is taken by switching the switching device 155; the difference is then processed by the signal processing circuit and output as a relative pressure from the terminal 143.

FIG. 1B shows a modification of FIG. 1A. This is, the switching device 155 is arranged so that signals from the capacitances 11, 12 and 13 are subjected to calculation to obtain a difference or differences after the signals are processed by the signal processing circuit.

If necessary, by constructing the sensor as shown in FIG. 1C, an atmospheric pressure signal is output from a terminal 144 by calculating the difference between sensed values from the pressure sensing capacitance 11 and a reference capacitance 13'. Further, a temperature signal is output from the terminal 141 by signal-processing of variations in the reference capacitance 13 due to temperature changes.

In this case, the two pressure sensing capacitances 11, 12 and the reference capacitance 13 have essentially the same temperature characteristic since they are formed on a single substrate adjacent to one another, and in the same process. Therefore, even if the ambient or environmental temperature is changed, errors due to temperature change can be compensated by calculating the difference between them using the signal processing circuit. Although the temperature coefficient of the capacitance type pressure sensor of the present invention is smaller than that of a conventional piezo-resistance type pressure sensor, the effect of temperature can be further decreased by such calculation processing.

The embodiment of FIG. 1C has two pressure sensing capacitances 11, 12 and two reference capacitances 13, 13'. A temperature signal can be obtained from the reference capacitance 13; an absolute pressure signal can be obtained from the difference in capacitance between the pressure sensing capacitance 12 and the (temperature sensing) reference capacitance 13; a relative pressure signal can be obtained from the difference in capacitance between the pressure sensing capacitance 11 and the pressure sensing capacitance 12; and an atmospheric pressure signal can be obtained from the difference in capacitance between the pressure sensing capacitance 11 and the reference capacitance 13'. In this embodiment, a temperature signal, as well as an absolute pressure signal, a relative pressure signal and an atmospheric pressure signal which are not affected by environmental temperature change, can be accurately obtained by the four electrostatic capacitances and the signal processing circuit 15 formed on a single chip.

An embodiment of the sensor portion shown in FIGS. 1A to 1C will be described in detail hereunder, referring to FIG. 2A, which is a cross-sectional view showing an assembled stand-alone type sensor. FIG. 2B is an enlarged cross-sectional view showing the sensor portion and FIGS. 1A to 1C of the block circuit diagrams, including structural details which are omitted from FIG. 2 for simplicity.

A sensor substrate 1 is made of silicon, and has two major sides (upper and lower sides in FIG. 2B). A casing 2, which is made of a material such as plastic, holds and surrounds the sensor substrate 1. A signal lead connector 3 is connected to the casing 2. An organic adhesive 4 is provided for airtightly adhering the sensor substrate 1 to the casing 2. A hole 21 is formed in a portion of the casing 2 for introducing atmospheric pressure. A pressure introducing pipe 5 is connected to the casing 2 at the opposite side to the hole 21 for introducing a pressure to be measured. A connecting wire 7 connects between a sensor portion and a connector 31. Silicone gel 6 is filled in a spacing formed in the casing 2 for protecting the sensor substrate 1 and the connecting wire 7.

As shown in FIG. 2B, two pressure sensing capacitances 11, 12 and a reference capacitance or temperature sensing capacitance 13 are formed as a complex on a single chip (the sensing substrate 1). One pressure sensing capacitance 12 is used for an absolute pressure reference sensor by introducing on it a pressure to be measured, and the other pressure sensing capacitance 11 is used to detect variation of atmospheric pressure by introducing atmospheric pressure thereon. An absolute pressure is obtained from difference in capacitance between the pressure sensing capacitance 12 and the reference capacitance 13. Further, as shown in FIGS. 1A to 1C, an output as a relative pressure sensor is output by taking the difference of the output signals from both capacitances 11, 12, using the signal processing circuit 15.

The structure of the sensor portion will be described in detail hereunder, referring to FIG. 2B. The two pressure sensing capacitances 11, 12 each having an absolute pressure reference structure in which pressure is sensed on the basis of absolute pressure, the reference capacitance 13 and the signal processing circuits 15 are formed as a complex on the sensor substrate 1. The two pressure sensing capacitances 11, 12 have exactly the same structure and are formed at the same time in a surface device process to be described later.

A fixed electrode 124 is formed on the sensor substrate 1, and an etching stopper film 123 is formed on the fixed electrode 124 for limiting a gap of a space 122. A diaphragm 121 is supported on an insulator film 125 formed on the sensor substrate to have a suitable gap between the etching stopper film 123 and the diaphragm 121. A seal 126 is provided in a hole formed in the diaphragm 121 for sealing the chamber 122 to provide a vacuum.

Further, the construction of the sensing portion of this embodiment includes the following. That is, on the diaphragm 121, a glass plate 20 is mounted, and a reinforcing plate 50 thereon. The glass plate 20 and the reinforcing plate 50 have holes 22 and 52 for introducing a pressure to be measured to the pressure sensing capacitance 12. A pressure to be measured is introduced onto the diaphragm 121 through the pressure introducing pipe 5, the holes 52 and 22.

The glass plate 20 and the reinforcing plate 50 further have holes 23 and 51, respectively, and silicone gel is filled in the holes 23 and 51. The holes 23 and 51 communicate with the hole 21 of the casing 2 (FIG. 2A), and atmospheric pressure is introduced onto the diaphragm of the pressure sensing capacitance 11 through the holes 21, 51 and 23.

The reference capacitance 13 also has the same construction and size as the pressure sensing capacitance 12 except that a vacuum chamber 132 defined by the diaphragm 121 and the glass plate 20 is provided.

An electrode from each of these sensors is connected to the adjacent signal processing circuit 15 in a minimum distance to reduce the floating capacitance as much as possible. A capacitance is converted into a standardized signal within a range of, for example, 1V to 5V by the signal processing circuit 15, and is led to a bonding pad or terminal 14 in the outside. The signal processing circuit 15 is air-tightly bonded in the periphery portion 127 with the glass plate 20, and is protected from moisture and contamination from the outside by sealing and maintaining the formed space 150 under vacuum or dry gas environment.

The reference capacitance 13 detects neither the pressure to be measured nor the atmospheric pressure, since the vacuum in chamber 132 of the reference capacitance 13 is air-tightly sealed with the glass plate 20. That is, the reference capacitance 13 detects only changes of the capacitance due to change of the environmental temperature. Therefore, the reference capacitance 13 functions as a kind of temperature sensor. The capacitance change due to temperature variation is caused also by change in the dielectric constant of the dielectric material, change in the gap due to thermal strain and so on.

The material of the sensor substrate 1 and the reinforcing plate 50 is a silicone resin, and the glass plate 20 is made of boron-silicate glass having a thermal expansion coefficient near that of silicone resin. The sensor substrate 1 and the glass plate 20, and the reinforcing plate 50 and the glass plate 20 are bonded to each other by an electrostatic method without using any adhesive.

Figure 2A:
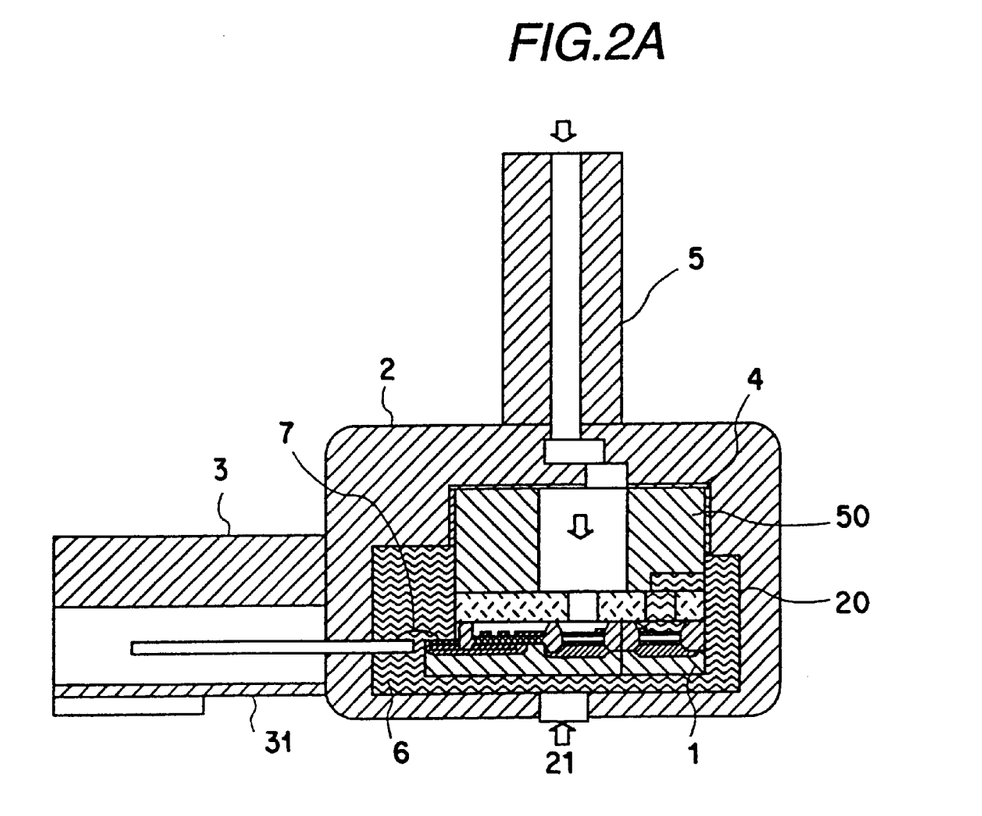
FIG. 2A is a cross-sectional view showing an embodiment of a pressure sensor in accordance with the present invention.
Figure 2B:
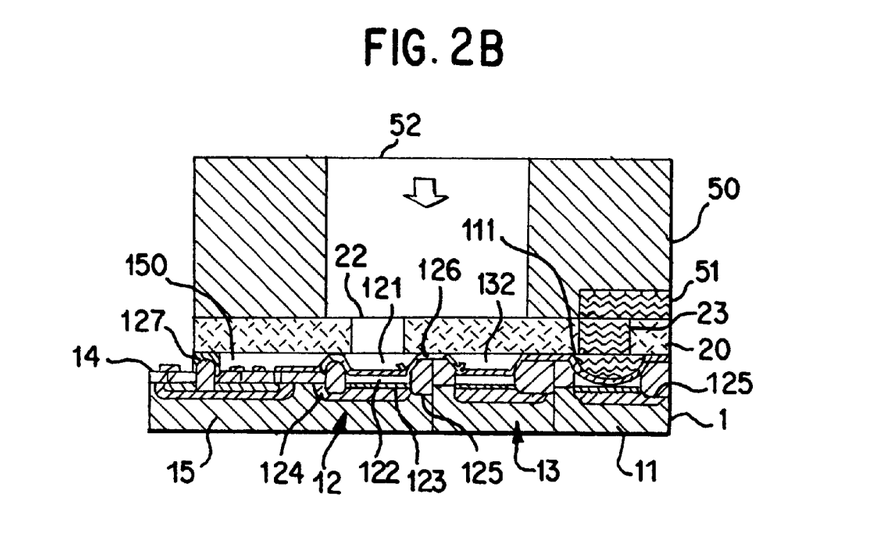
FIG. 2B is an enlarged view of a part of FIG. 2A.

As shown in FIG. 2A, since it is bonded and fixed to the casing 2 made of a plastic material, the silicone resin reinforcing plate 50 is designed to be thicker than the glass plate 20 so as to have a high rigidity. Irreversible thermal strain due to differences of thermal expansion coefficients of the both materials is therefore avoided.

The pressure to be measured is introduced through the pressure introducing pipe 5 onto the pressure sensing capacitance 12 of the sensor plate 1. The diaphragm 121 of the pressure sensing capacitance 12 is moved corresponding to this pressure, so that the gap of the chamber 122 changes, changing the electrostatic capacitance. In processing the electrostatic capacitance using the signal processing circuit 15, its characteristic change due to the environmental temperature change is corrected using the reference capacitance 13 and the electrostatic capacitance change is converted to a standardized electric signal within a range of, for example, 1V to 5V. The signal proportional to the pressure to be measured is then output to the external through the connector 3.

Atmospheric pressure introduced through the hole 21 formed in the casing 2 is received on the diaphragm 121 through the reinforcing plate 50 and the hole 21 in the glass plate 20. Although there is silicone gel 6 having a viscoelasticity in the middle of the passage introducing the atmospheric pressure, the pressure sensing capacitance 11 can measure the atmospheric pressure relative to the absolute pressure since the silicone gel is soft enough to transmit pressure.

Although the above description has been made on a case where the processing calculation is performed in the stage of electrostatic capacitance, the calculation may be performed in the stage after the capacitance change is converted into a voltage signal as shown in FIG. 1B. Selection of the calculation stage is determined depending on the design of the sensor such as magnitude of the signal change, SN ratio and so on.

Figure 3:
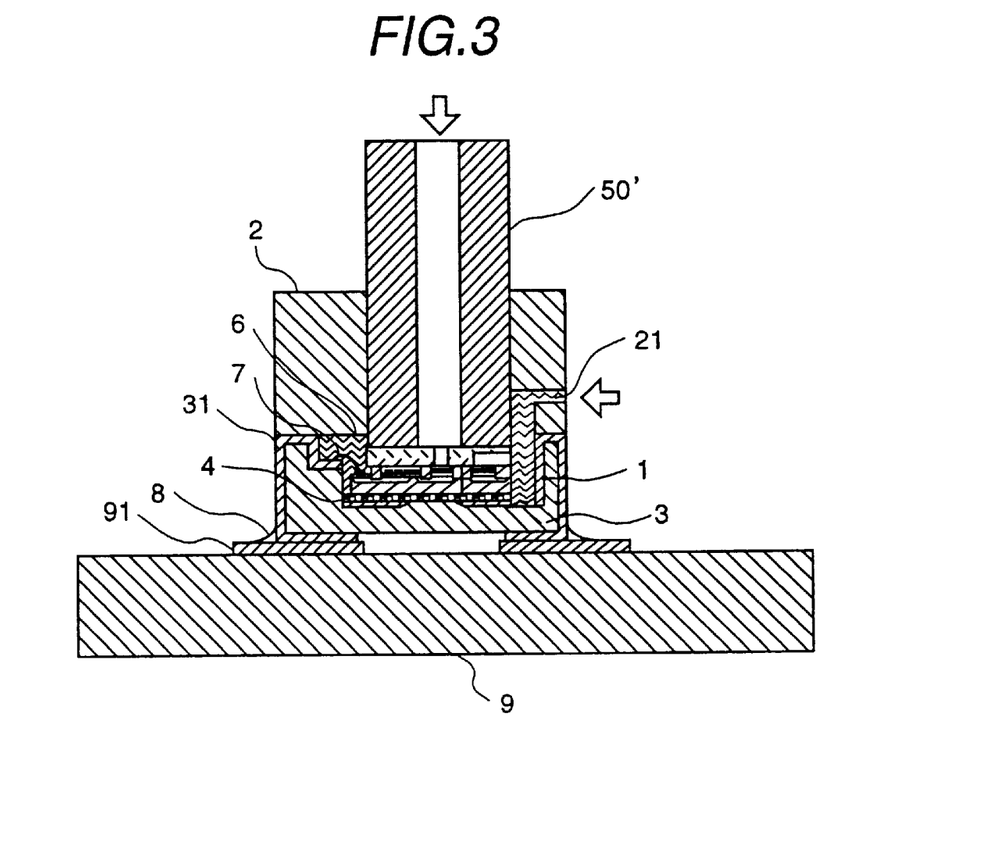
FIG. 3 is a cross-sectional view showing the mounting structure of another embodiment of a sensor in accordance with the present invention.

FIG. 3 shows a mounting structure of another embodiment of a sensor in accordance with the present invention. The structure of the sensor substrate 1 is the same as that described above. The different points are the casing 2 mounting the sensor substrate 1 and the structure of signal lead-out portion. In order to cope with the so-called surface mount where the signal lead-out is connected to a wiring pattern 91 on a mounting board 9 using solder 8, the sensor substrate 1 is fixed inside a connector 3 having a plated wiring 31 with adhesive 4, and the wiring 31 and the pad of the sensor substrate 1 are connected with a connecting wire 7. Pressure to be measured is introduced through a pressure introducing pipe 50' fixed to the casing 2 and applied onto the absolute pressure or reference sensing capacitance 12 (not shown in FIG. 3) on the sensor substrate 1; and atmospheric pressure is applied to the pressure sensing capacitance 11 (not shown in FIG. 3) through an atmospheric pressure introducing portion 21. The signal processing circuit 15 (not shown in FIG. 3) executes the calculation described in FIGS. 1A, 1B or 1C, and outputs a signal relative to absolute pressure and a sensor signal proportional to a relative pressure, if required.

Figure 4:
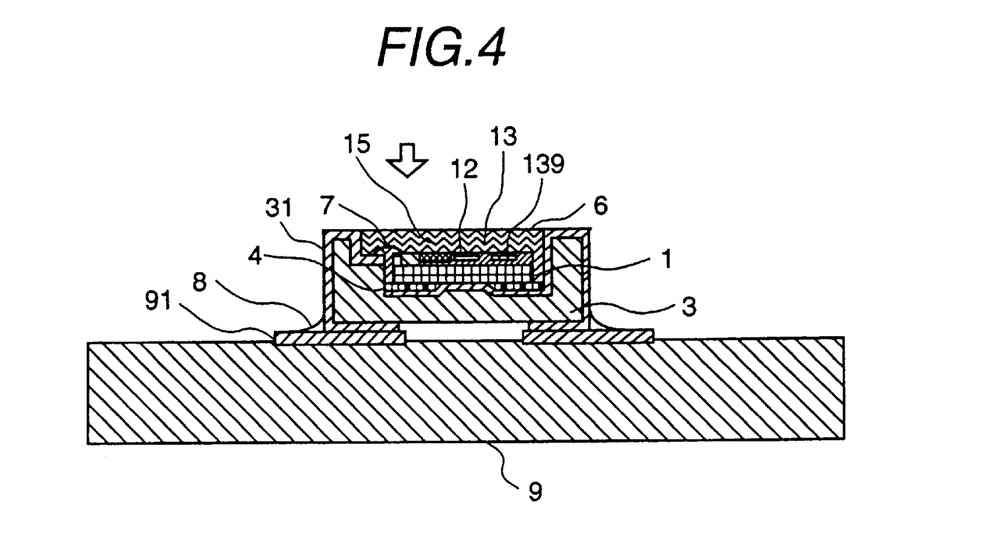
FIG. 4 is a cross-sectional view showing the mounting structure of a further embodiment of a sensor in accordance with the present invention.

FIG. 4 shows an embodiment of an atmospheric pressure sensor in accordance with the present invention.

In this embodiment, the atmospheric pressure sensor comprises a pressure sensing capacitance 12 as mentioned in the above embodiment and a reference capacitance 13. The reference capacitance 13 has the same construction as in FIG. 2B except that a support 139 instead of the vacuum space 132 of FIG. 2B is formed in the central portion of the diaphragm so that the reference capacitance is not changed by atmospheric pressure. By calculating the difference between the signals of the pressure sensing capacitance 12 detecting atmospheric pressure and the reference capacitance 13, a signal proportional to the atmospheric pressure is output. Since the pressure to be measured is applied directly to the sensor 1, the casing 2 and the pressure introducing pipe 50' fixed to the casing can be removed thereby simplifying the structure.

A manufacturing process of the sensor portion as shown in FIG. 2B will be described below, referring to FIGS. 5A to 5F.

Figure 5A:
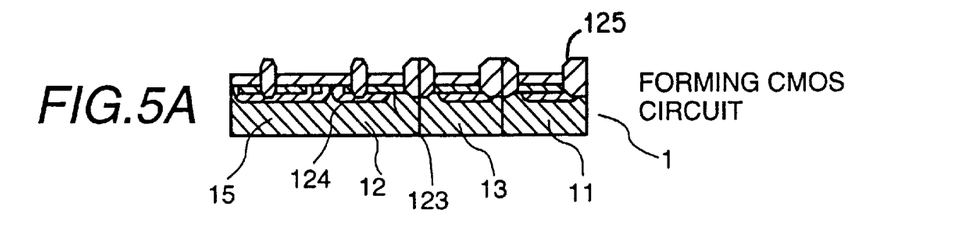
FIGS. 5A to 5F are sectional views showing a manufacturing process for a sensor portion in accordance with the present invention.

FIG. 5A shows a signal processing circuit forming process which forms the signal processing circuits 15, using, for example, a standard CMOS (complementary metal oxide semiconductor) circuit forming process.

Figure 5B:
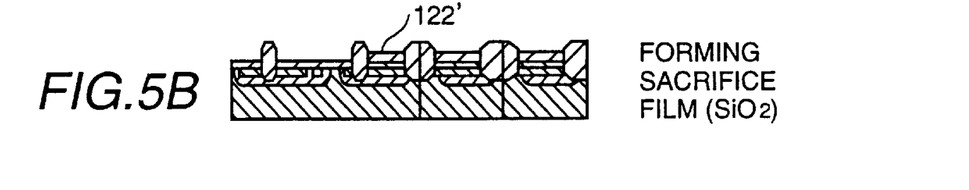

FIG. 5B shows a process of forming a sacrifice film 122' to be removed later, wherein the film 122' of, for example, $SiO_2$ is formed so as to have a thickness necessary for a designed value of electrostatic capacitance of the sensor.

Figure 5C:
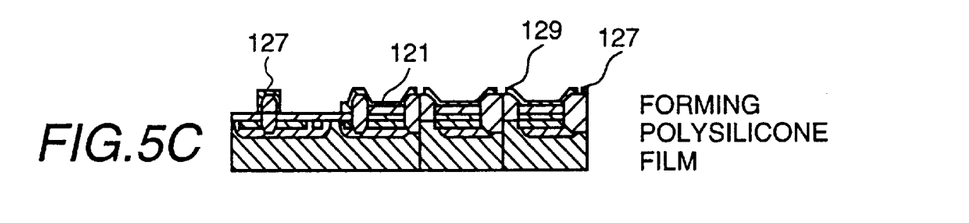

FIG. 5C shows a process of forming a polysilicone film to provide a diaphragm 121 which is formed corresponding to a measured pressure range. Insulating grooves 129 each are formed by removing a part of the polysilicone film in the peripheral portion of the adjacent diaphragm. Further, a polysilicone film 127 formed in the peripheral portion of the diaphragm and in the peripheral portion of the signal processing circuit 15 acts as an adhesive for a glass substrate to be bonded later.

Figure 5D:
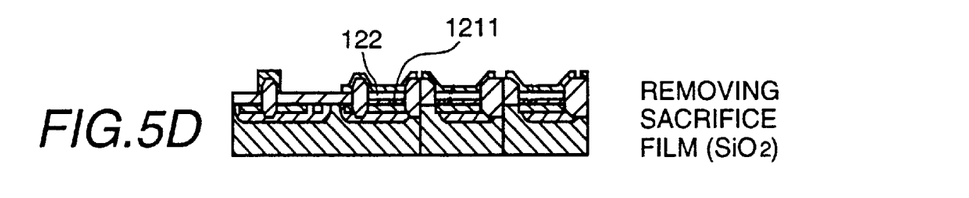

FIG. 5D shows a process for etching removal of the sacrifice film 122', in which the $SiO_2$ is removed (by introducing fluoric acid through holes 1211 each bored in a part of the polysilicone film) to form a space 122. Since an $Si_3N_4$ film has been formed on the fixed electrode 124 in the process (A), the electrode 124 is not etched, and the space 122 having a gap equal to the thickness of the oxide film 122' of the sacrifice film is accurately formed.

A diameter of the diaphragm and a gap of the space are determined by the thick oxide film 125 formed in the peripheral portion and the oxide film 122' as the sacrifice film. The electrostatic capacitance (that is, the sensitivity) is determined accordingly.

Figure 5E:
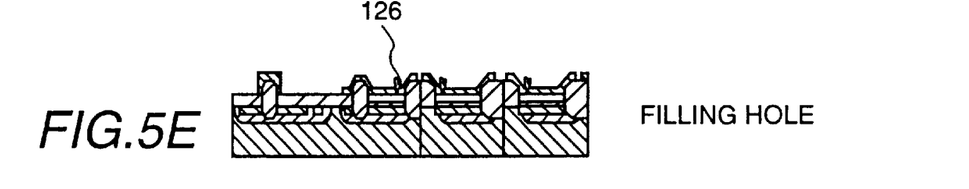

FIG. 5E shows a process of sealing the holes 1211 of the polysilicone film 121. Seals 126 are formed by forming the same films of polysilicone and $SiO_2$ and removing unnecessary portions.

Figure 5F:
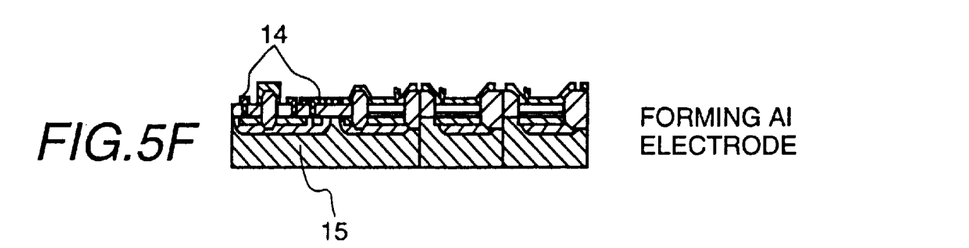

FIG. 5F shows a process for forming circuits 15 and aluminum terminals 14 of bonding pads.

According to the present invention, it is possible to provide a pressure sensor in which the effect of temperature variations is small, and which is high in sensitivity, small in size and low in cost, by forming an absolute pressure sensor, a relative pressure sensor and an atmospheric pressure sensor as a complex on a single chip.

Further, according to the present invention, when an over-load pressure (exceeding the measuring range) is applied to the diaphragm, the diaphragm is deformed over the gap, but is brought into contact with the substrate surface, thereby avoiding excessive deformation. Therefore, the sensor can withstand a pressure which is several tens of times as high as the measuring range.

Another embodiment is described hereunder, referring to FIGS. 6 to 10. However, before description of the embodiment, a conventional semiconductor pressure sensor is described referring to FIGS. 11–15.

Figure 11:
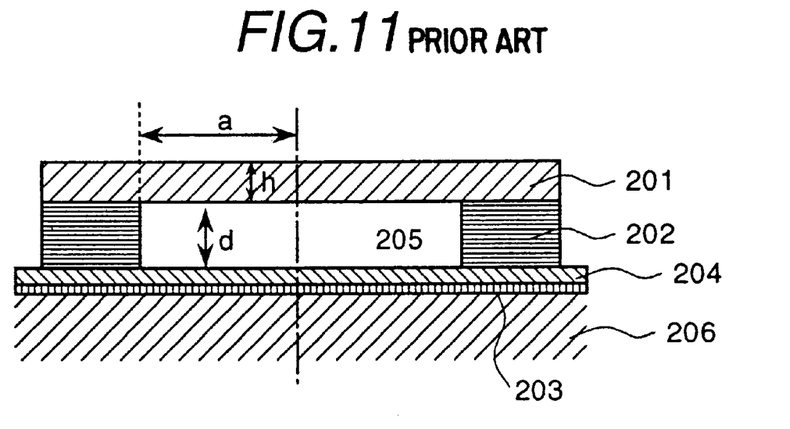
FIG. 11 is a cross-sectional view showing the conventional semiconductor pressure sensor.

An example of a conventional sensor is shown in FIG. 11. The sensor comprises a movable electrode 201 having a radius (a) and a uniform thickness (h), a support 202 for supporting the movable electrode 201 to provide a gap 205 of width (d), a fixed electrode 203 disposed inside or on a substrate 206 and an insulator film 204. When a pressure acts on the sensor, the movable electrode 201 deforms close to the fixed electrode 203, changing the electrostatic capacitance between them. By detecting the change, the pressure is detected.

Figure 12:
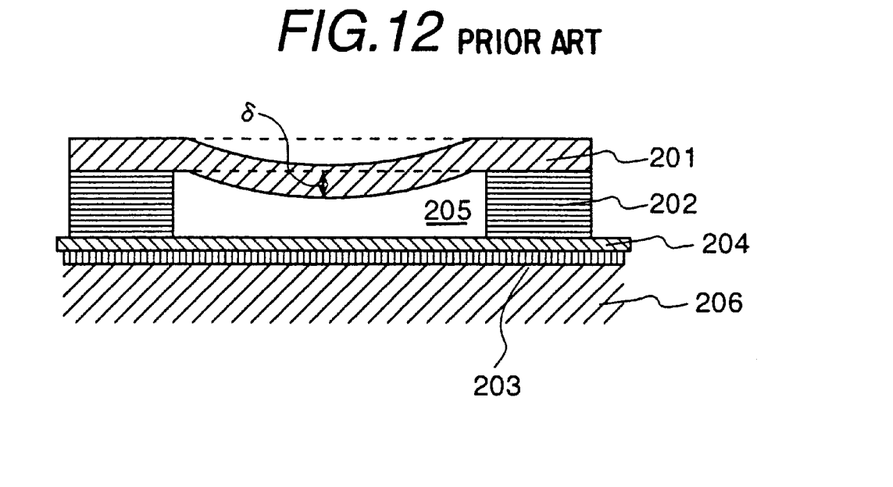
FIG. 12 is a cross-sectional view showing the conventional sensor when the movable electrode is deformed by an applied pressure.

As shown in FIG. 11, the periphery of the movable a electrode 201 is fixed and is not deformed by the application of pressure, while the central portion, which is free, is bent as shown in FIG. 12. If displacement of the central portion of the movable electrode 201 is designated as δ, electrostatic capacitance between the movable electrode and the fixed electrode at zero displacement is represented by $C_O$, and specific displacement is α (=δ/d), the electrostatic capacitance C(δ) of the sensor can be expressed by Equation 1.

$$C(\delta) = C_0 \frac{1}{2\sqrt{\alpha}} \ln \frac{1+\sqrt{\alpha}}{1-\sqrt{\alpha}} \quad \text{Equation 1}$$

Figure 13:
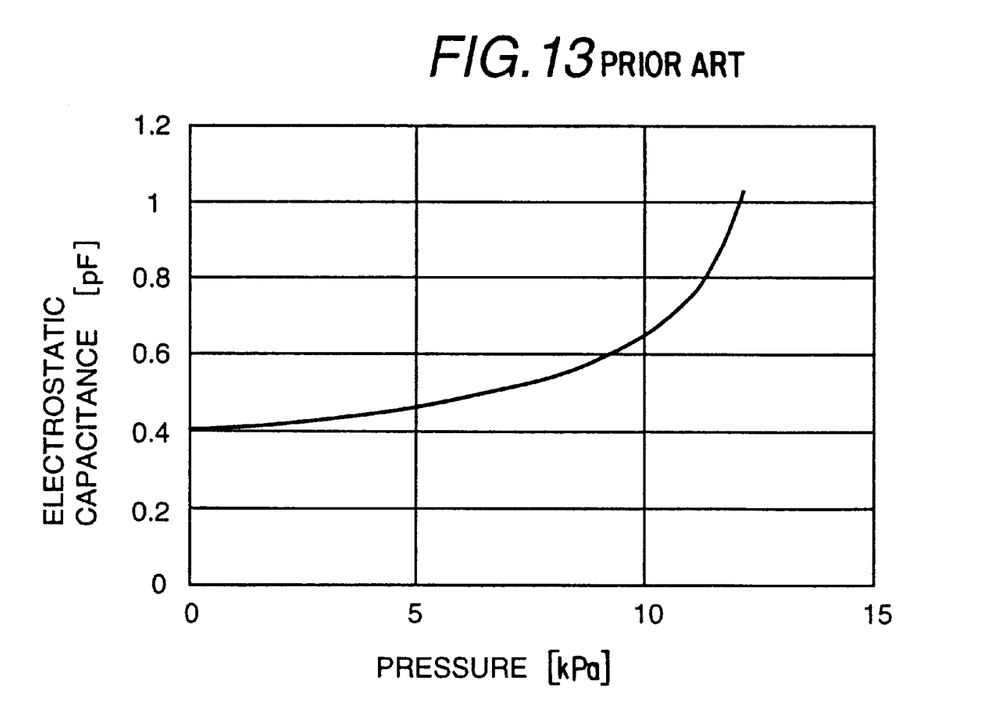
FIG. 13 is a graph showing the relationship between the pressure on the movable electrode and the capacitance in the conventional semiconductor pressure sensor.

Since the relationship between electrostatic capacitance C(δ) and displacement δ or α is non-linear as shown by the equation, the relationship of electrostatic capacitance C(δ) to pressure is also non-linear, as shown in FIG. 13. Such non-linearity causes an output error. On the other hand, since the sensor has a structure in which the support 202 is interposed between the electrodes 201, 203, a parasitic capacitance is produced in this portion. This parasitic capacitance further increases the non-linearity and decreases sensitivity of the sensor at the same time.

The embodiment described hereinafter, which relates to an electrostatic capacitance type physical sensor, is designed to solve the problem described above, as explained below.

Figure 6:
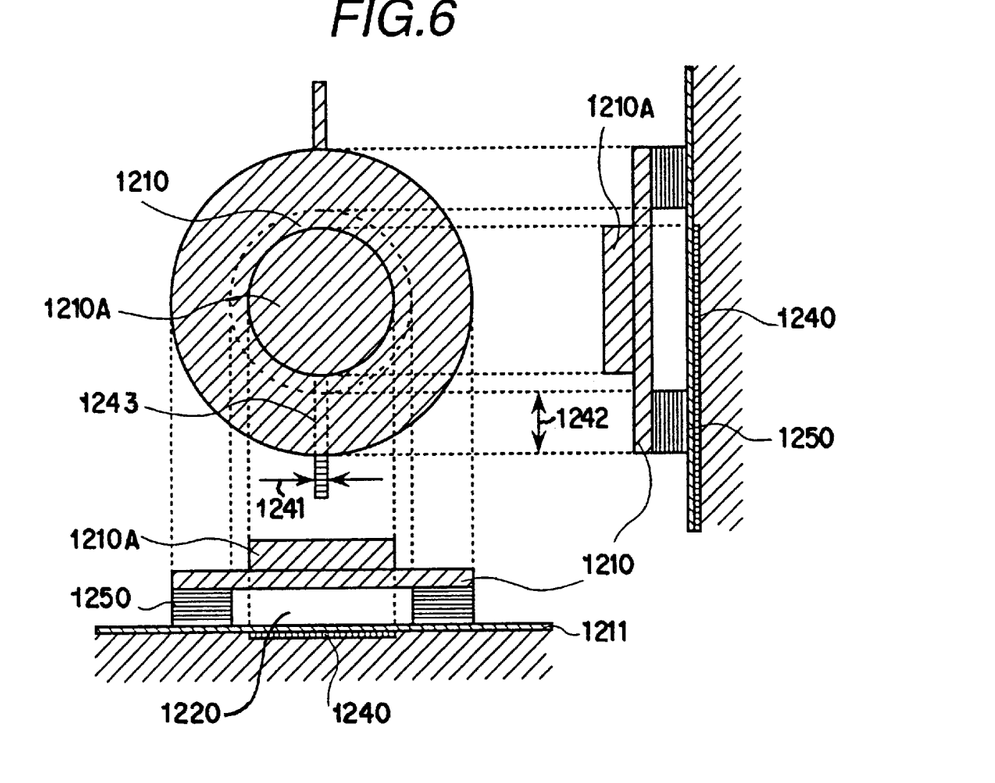
FIG. 6 is a view of an electrostatic capacitance type sensor in another embodiment of the sensing capacitance of the present invention.

In FIG. 6, the sensor comprises a fixed electrode 1240 placed in an inside position of a substrate or an upper position of the substrate, a movable electrode 1210 which is opposite to the fixed electrode 1240, supported by a support 1250 in the periphery so that it can be deformed by an external force, and a signal processing unit for calculating the reciprocal of an electrostatic capacitance. (The signal processing unit is not shown in FIG. 6, but may be incorporated in the signal processing circuits as formed in FIGS. 1A to 1C.)

The movable electrode 1210 has a displacement portion composed of a central portion 1210A and a peripheral portion which is more deformable than the central portion. The central portion 1210A has a larger elasticity or a thicker thickness compared to the peripheral portion, and the fixed electrode 1240 has a dimension not larger than a range of the high elastic central portion 1210A of the movable electrode 1210 excluding an electrode lead portion when the fixed electrode is seen from a direction normal to the movable electrode.

By forming the central portion 1210A so as to have a larger elasticity or a thicker thickness compared to the peripheral portion, the central portion can be deformed when pressure is applied, and is flat when it is without strain. Therefore, the movable electrode 1210 is moved toward and away from the fixed electrode 1240, parallel to itself. On the other hand, by limiting the dimension of the fixed electrode 1240 within the flat portion 211 of the movable electrode 1210, the electrostatic capacitance varies according to Equation 2. By calculating the reciprocal of the electrostatic capacitance, an output can be made linear to displacement δ of the movable electrode 1210 as expressed by Equation 3.

$$C(\delta) = C_0 \frac{1}{1-\frac{\delta}{d}} \quad \text{Equation 2}$$

$$\frac{1}{C(\delta)} = \frac{1}{C_0}\left(1 - \frac{\delta}{d}\right) \quad \text{Equation 3}$$

Further, a highly accurate electrostatic capacitance type physical sensor can be provided by making a magnitude of electrostatic capacitance of the parallel component to the sensor portion of a parasitic electrostatic capacitance produced in the periphery of the sensor not larger than a base capacitance of the sensor portion.

The movable electrode 1210 has a higher elastic portion 1210A or a thicker thickness portion arranged in the central portion. The higher elastic portion is manufactured by vapor-depositing a polycrystalline silicon or SIC or by thickening with a raw material of the electrode itself. By forming it in a chemical vapor deposition method or a gas phase epitaxial growth method and then by shaping through etching, the movable electrode 1210 can be manufactured in a desired shape without being restricted by properties of the material used. By a conventional manufacturing method of anisotropic etching of single crystal silicon, it is difficult to form the movable electrode in a desired shape except for a square shape. Further, there is a difficulty to independently determine its thickness and its area since there is a correlation between them. On the other hand, it is preferable that an area of the central portion 1210A of the movable electrode is between 15% and 70% of the total displacement area of the movable electrode, preferably about 70%. The acceptable plane shape of the movable electrode may be square, circular and polygonal.

The fixed electrode 1240 has a dimension not larger than a range of the high elastic central portion (excluding an electrode lead portion), when seen from a direction normal to the movable electrode, as well as a shape which conforms to that of the high elastic central portion of the movable electrode. By applying this limitation to the fixed electrode 1240, it is possible to obtain an electrostatic capacitance which conforms faithfully to Equation 1. The support 1250 may have any value of electric conductivity since there is the insulator film 1211 on the fixed electrode 1240. However, it is preferable that the support is made of an insulator in order to suppress parasitic capacitance, as described later.

Figure 7:
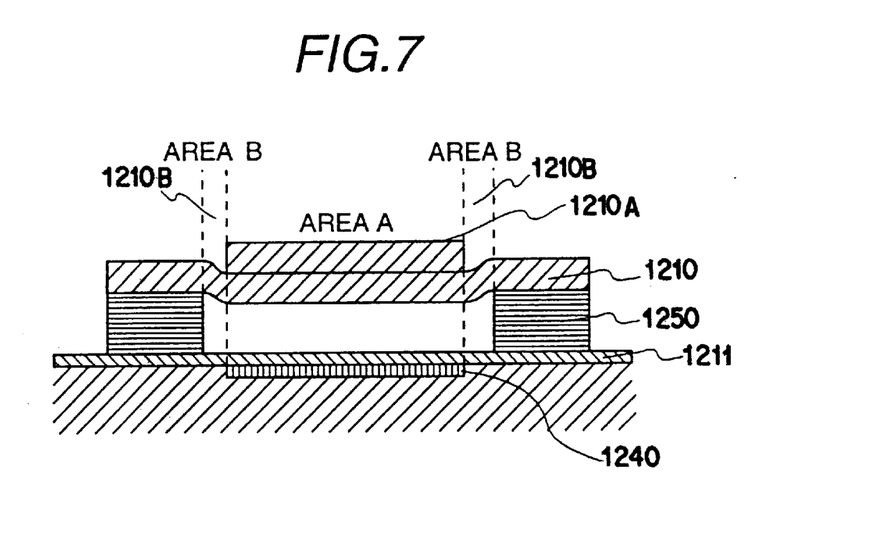
FIG. 7 is a cross-sectional view showing the sensor of FIG. 6, in which the movable electrode is deformed.

FIG. 7 shows the sensor with the movable electrode 1210 displaced. A region A (1210A) is a central region which remains flat even after displacement by the high elastic central portion 1210A of the movable electrode 1210. The movable electrode 1210 is moved toward and away from the fixed electrode 1240 parallel to itself. By limiting movement of the fixed electrode 1240 within this range, it is possible to reduce the effect of the deformed portion B (1210B) of the movable electrode 210, which produces non-linearity.

The sensor of this embodiment is a circular pressure sensor formed on a silicon wafer, in which full-scale pressure is 1 kPa. The movable electrode 1210 is made of poly-crystal silicon; the radius (a) of the movable electrode 1210 is 85 µm; the thickness (h) of the movable electrode is 5 µm; and the distance (d) between the movable electrode 210 and the fixed electrode 1240 is 0.5 µm. Capacitance when the movable electrode 1240 is not displaced (base capacitance $C_0$) is 0.486 pF. The radius of the elastic central portion 1210A of the movable electrode is 68 µm.

Figure 8:
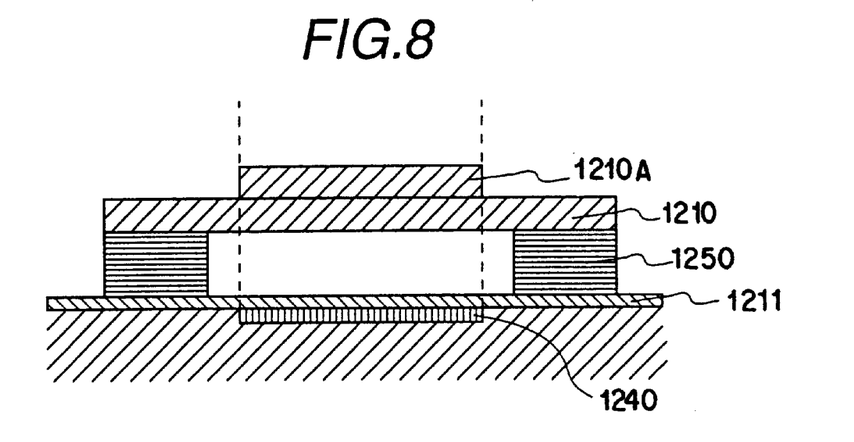
FIG. 8 is an enlarged side view of the sensor of FIG. 6.
Figure 9:
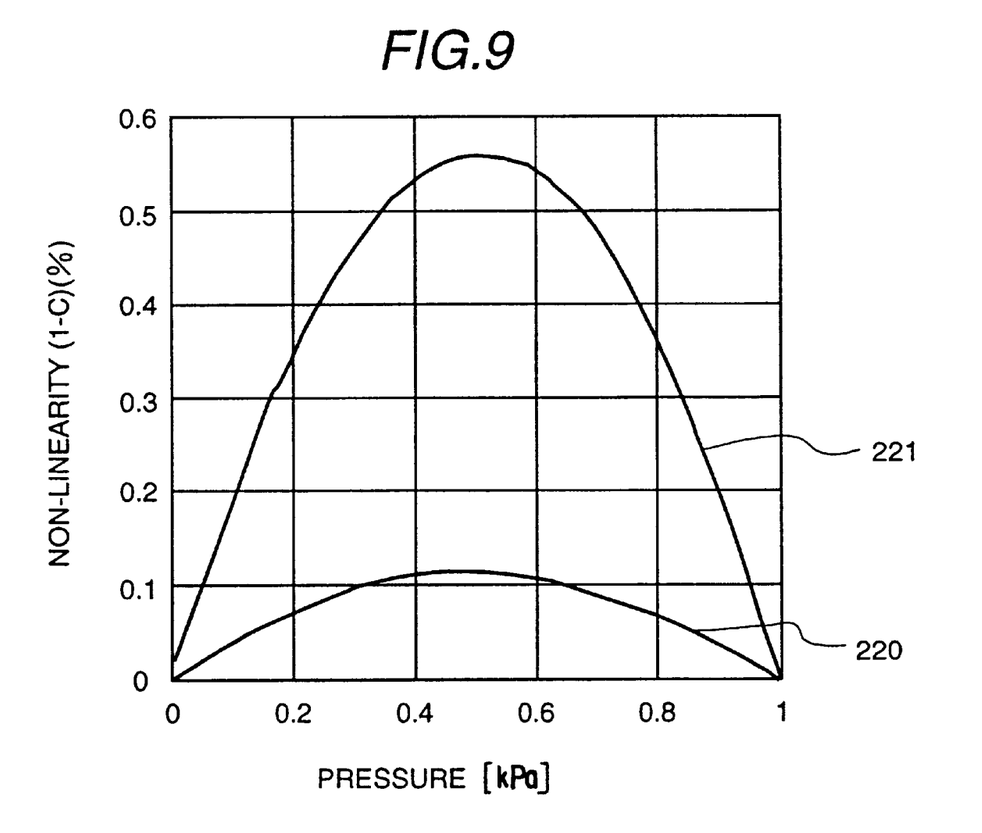
FIG. 9 is a graph showing the non-linearity of the electrostatic capacitance sensor in accordance with the present invention, and of the conventional electrostatic capacitance sensor.
Figure 14:
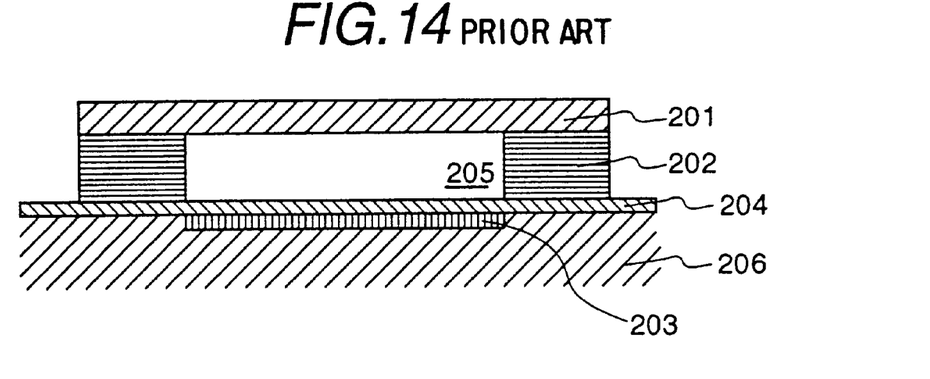
FIG. 14 is a cross-sectional view of another conventional semiconductor pressure sensor.
Figure 15:
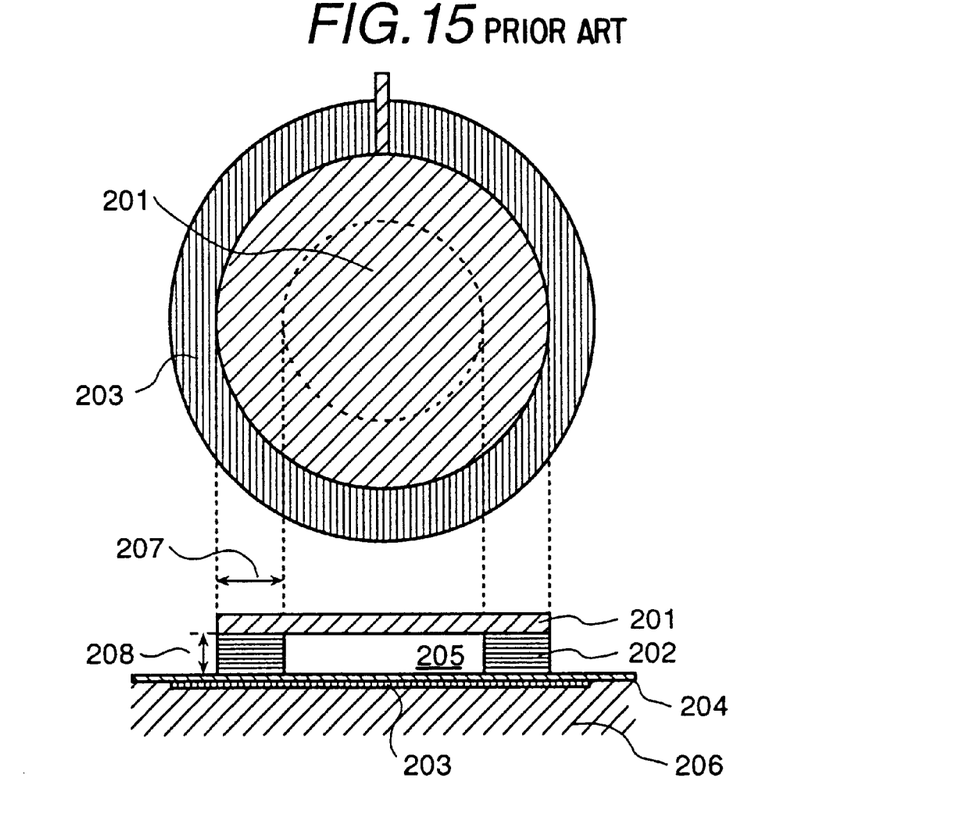
FIG. 15 is a cross-sectional view of another conventional electrostatic capacitance type sensor.

FIG. 9 shows non-linearity 220 of the sensor of FIG. 8 in accordance with the present invention and non-linearity 221 of the conventional sensor of FIG. 14. The maximum non-linearity of the conventional sensor is 0.57% at pressure of 0.505 kPa, whereas the maximum non-linearity of the sensor in accordance with the present invention is 0.12% at pressure of 0.501 kPa. Therefore, by employing the sensor in accordance with the present invention, the non-linearity can be reduced to less than one fifth that of the conventional sensor.

On the other hand, by limiting the fixed electrode 1240 to a dimension not larger than a range of the high elastic central portion (excluding an electrode lead portion) when seen from a direction normal to the movable electrode 1210, the parallel component of the parasitic capacitance can be reduced. The parallel parasitic capacitance Cp decreases intensity of the sensor signal and accordingly reduces its sensitivity. In the structure of the conventional sensor shown in FIG. 15, since the fixed electrode 203 also exists under the support 202, parallel parasitic capacitance is produced in the supporting portion. The support is made of silicon dioxide and has a width 207 of 50 µm, a thickness 208 of 0.5 µm, and thereby the parasitic capacitance Cp becomes 2.33 pF which is equivalent to 478% of the base capacitance of the sensor. On the other hand, in the sensor in accordance with the present invention as shown in FIG. 6, the parallel parasitic capacitance is produced only by that portion 1241 where the supporting portion overlaps with the lead wire portion of the fixed electrode. The width of the lead wire 1241 is 2 µm and the width 1242 of the supporting body is 50 µm, and accordingly the produced parasitic capacitance Cp can be suppressed to 6.7 fF which is equivalent to 1.4% of the sensor base capacitance $C_0$.

Figure 10:
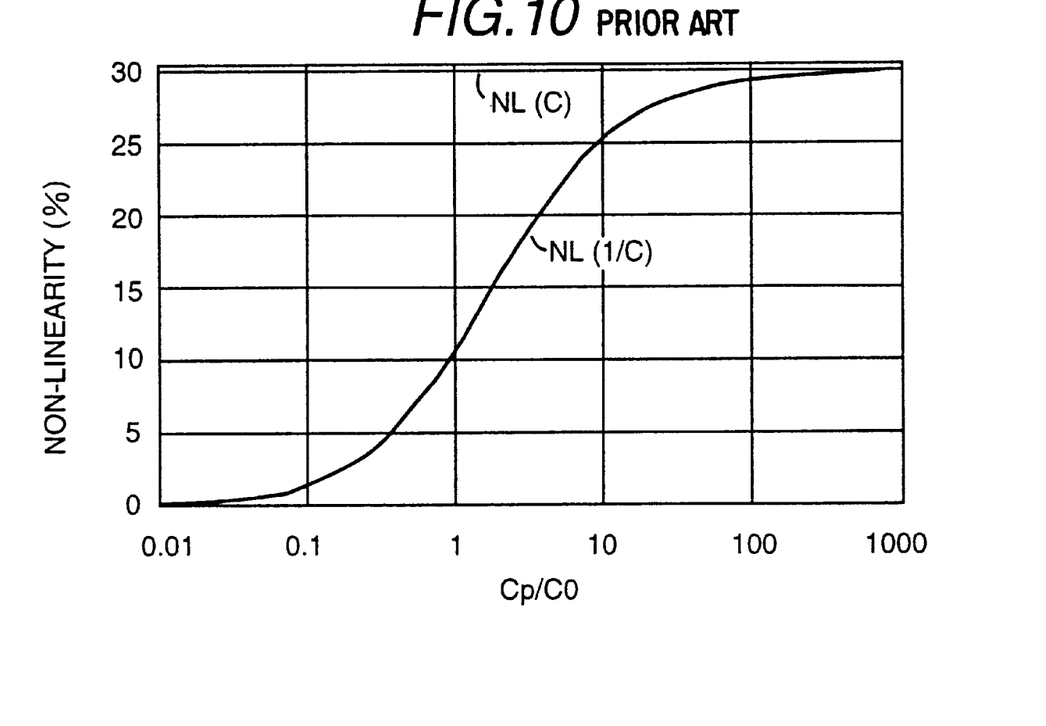
FIG. 10 is a graph showing the parasitic capacitance dependence of non-linearity.

FIG. 10 shows the change in non-linearity NL with respect to parallel parasitic capacitance $Cp/C_0=0.7$ under specific displacement δ/d of the movable electrode. NL(C) indicates non-linearity when reciprocal processing is not performed. NL(1/C) indicates non-linearity when reciprocal processing is performed. It can be understood that the parasitic capacitance is reduced by performing the reciprocal processing, whereby non-linearity can be reduced and high accuracy can be attained. In a range of the specific parallel capacitance $Cp/C_0$ below 1 (one), the non-linearity becomes smaller than 10% and high accuracy can be attained.

The present invention is not limited to the application of an external force in the form of pressure as such, but can be applied to any external forces to displace the movable electrode.

As described above, the present invention can provide a highly accurate electrostatic capacitance type physical sensor, with reduced non-linearity in its output, in which the movable electrode is composed of a central portion and a peripheral portion, the central portion having a larger elasticity or a thicker thickness than the peripheral portion, and the fixed electrode has a dimension not larger than a range of the high elastic central portion of the movable electrode (excluding an electrode lead portion) when the fixed electrode is seen from a direction normal to the movable electrode. Further, the magnitude of the electrostatic capacitance of the parallel component to the sensor portion relative to a parasitic electrostatic capacitance produced in the periphery of the sensor, is no larger than the base capacitance of the sensor portion.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A semiconductor pressure sensor comprising:
    a plurality of pressure sensing electrostatic capacitances; and
    a reference electrostatic capacitance;
    wherein said pressure sensing electrostatic capacitances and said reference electrostatic capacitance are disposed on one side of a silicon chip.

2. A semiconductor pressure sensor according to claim 1, wherein a signal processing circuit for processing signals from said pressure sensing electrostatic capacitances and said reference electrostatic capacitance is disposed on the same side of said silicon chip on which said plurality of capacitances are disposed.

3. A semiconductor pressure sensor according to claim 1, wherein:
    an absolute pressure is detected from variation of capacitance of a first one of said pressure sensing electrostatic capacitances;
    an atmospheric pressure is detected from variation of capacitance of a second one of said pressure sensing electrostatic capacitances; and
    a temperature is detected from variation of capacitance of said reference capacitance.

4. A semiconductor pressure sensor according to claim 3, wherein a pressure relative to atmospheric pressure is detected from a difference between the variation in capacitance of said first pressure sensing electrostatic capacitance and the variation in capacitance of said second pressure sensing electrostatic capacitance.

5. a semiconductor pressure sensor according to claim 4, wherein:
    a signal processing circuit is integrally formed on the same side of the silicon chip on which said plurality of capacitances are formed; and
    said signal processing circuit is air-tightly and electrostatically bonded by an electrically conductive bonding film formed in a periphery of the signal processing circuits, and with one of a glass film and a glass substrate.

6. A semiconductor pressure sensor according to claim 5, wherein electrostatic capacitance changes of the two sensors formed the same side of the silicon chip are converted into voltage signals, and relative pressure relative to atmospheric pressure is detected from a difference between the voltage signals.

7. A semiconductor pressure sensor according to claim 1, wherein said pressure sensing electrostatic capacitances comprise:
    an electrostatic capacitance couple composed of a diaphragm acting as a movable electrode moved in response to a pressure, and a fixed electrode formed opposite to and separated from said diaphragm by a space formed between said diaphragm and said fixed electrode, and insulated from said diaphragm;

a glass plate common to said pressure sensing electrostatic capacitances, and having a first pressure introducing hole therein; and a bonding film formed in a periphery of said diaphragm for air-tightly bonding said diaphragm to said glass plate.

8. A semiconductor pressure sensor according to claim 7, wherein said bonding film is made of an electrically conductive film material, and electrostatically bonds a reinforcing silicon plate having a second pressure introducing hole which communicates with said first pressure introducing hole through said glass plate.

9. A semiconductor pressure sensor according to claim 8, wherein said diaphragm is separated from an exterior of said pressure sensor by an air-tight space formed between said bonding film and said glass plate.

10. A semiconductor pressure sensor according to claim 1, wherein each of said pressure sensing electrostatic capacitances comprises:

a semiconductor chip;

a fixed electrode provided on said semiconductor chip;

a movable electrode arranged opposite said fixed electrode, and supported at a periphery thereof;

wherein said movable electrode has a displacement portion composed of a central area thereof, and a peripheral portion which is more deformable than said central portion; and wherein said fixed electrode has a maximum planar extent which is not larger than a planar extent of said central area of said movable electrode.

11. A semiconductor pressure sensor comprising:

a plurality of pressure sensing electrostatic capacitances; and a reference electrostatic capacitance;

wherein said pressure sensing electrostatic capacitances and said reference electrostatic capacitance are disposed on one side of a silicon chip; and wherein said reference capacitance is a temperature sensor.

12. A semiconductor pressure sensor of electrostatic capacitance type, comprising:

a substrate;

a fixed electrode provided on said substrate;

a movable electrode arranged opposite said fixed electrode, and supported at a periphery thereof;

wherein said movable electrode has a displacement portion composed of a central area thereof, and a peripheral portion which is more deformable than said central portion; and wherein said fixed electrode has a maximum planar extent not larger than a planar extent of said central area of said movable electrode.

13. The sensor according to claim 12, further comprising:

a signal processor for calculating the reciprocal of electrostatic capacitance;

wherein said central area of said movable electrode has one of a larger elasticity and a greater thickness than said peripheral portion.

14. The sensor according to claim 12, wherein the central portion of said movable electrode is formed in by a process selected from the group consisting of chemical vapor deposition and gas phase epitaxial growth, and is then shaped by etching.

15. An electrostatic capacitance type sensor, comprising:

a substrate;

a fixed electrode on said substrate; and a movable electrode having a parallel displacement portion mounted on said substrate, to be deformed by receiving an external force;

wherein a parallel component of parasitic electrostatic capacitance produced in the periphery of said sensor has a magnitude which is no greater than a base capacitance of the sensor portion.

16. The sensor according to claim 15, wherein said movable electrode has a displacement portion composed of a central area thereof, and a peripheral portion which is more deformable than said central portion, and said fixed portion has a maximum planar extent which is not larger than a maximum planar extent said central portion of said movable electrode.

17. A semiconductor pressure sensor comprising:

a substrate;

at least a first pressure sensing electrostatic capacitance which is coupled to receive and measure an ambient pressure;

at least a second pressure sensing electrostatic capacitance which is coupled to receive and measure an absolute pressure; and a reference electrostatic capacitance which is insulated from effects of changing pressure, and is coupled to at least one of said at least a first pressure sensing electrostatic capacitance and said at least a second pressure sensing electrostatic capacitance, for sensing temperature;

wherein said first, second and reference electrostatic capacitances are formed on the same side of said substrate.

18. The pressure sensor according to claim 17 further comprising:

a first circuit for determining a difference between said first and second pressure sensing electrostatic capacitances and outputting a signal indicative thereof, said first circuit being formed on said substrate on the same side on which said electrostatic capacitances are formed.

19. The pressure sensor according to claim 18 further comprising:

a second circuit for determining a difference between said second pressure sensing electrostatic capacitance and said reference electrostatic capacitance, said second circuit being formed on said substrate on the same side on which said first circuit and said electrostatic capacitances are formed.

20. A semiconductor pressure sensor according to claim 19, wherein said pressure sensing electrostatic capacitances comprise:

an electrostatic capacitance couple composed of a diaphragm acting as a movable electrode moved in response to a pressure, and a fixed electrode formed opposite to and separated from said diaphragm by a space formed between said diaphragm and said fixed electrode, and insulated from said diaphragm;

a glass plate common to said pressure sensing electrostatic capacitances, and having a first pressure introducing hole therein; and a bonding film formed in a periphery of said diaphragm for air-tightly bonding said diaphragm to said glass plate.

21. A semiconductor pressure sensor according to claim 20, wherein said bonding film is made of an electrically conductive film material, and electrostatically bonds a reinforcing silicon plate having a second pressure introducing hole which communicates with said first pressure introducing hole through said glass plate.

22. A semiconductor pressure sensor according to claim 17, wherein said pressure sensing electrostatic capacitances comprise:

an electrostatic capacitance couple composed of a diaphragm acting as a movable electrode moved in response to a pressure, and a fixed electrode formed opposite to and separated from said diaphragm by a space formed between said diaphragm and said fixed electrode, and insulated from said diaphragm;

a glass plate common to said pressure sensing electrostatic capacitances, and having a first pressure introducing hole therein; and a bonding film formed in a periphery of said diaphragm for air-tightly bonding said diaphragm to said glass plate.

23. A semiconductor pressure sensor according to claim 22, wherein said bonding film is made of an electrically conductive film material, and electrostatically bonds a reinforcing silicon plate having a second pressure introducing hole which communicates with said first pressure introducing hole through said glass plate.

24. A method of making a semiconductor pressure sensor, comprising:

providing a planar substrate;

forming a plurality of pressure sensing electrostatic capacitances on a single surface of said substrate; and forming a circuit for processing output signals from said pressure sensing electrostatic capacitances, on the same surface of said substrate on which said pressure sensing electrostatic capacitances are formed.

25. The method according to claim 24, further comprising:

forming a reference electrostatic capacitance on the same surface of said substrate on which said pressure sensing electrostatic capacitances are formed;

wherein said circuit also processes output signals from said reference electrostatic capacitance.

26. The method according to claim 25, wherein said steps of forming pressure sensing and reference electrostatic capacitances comprises:

forming fixed electrodes in a surface of said substrate;

forming an insulator film on said surface of said substrate, including said fixed electrodes, forming a conductive film on said insulator film; and selectively removing said insulator film in areas adjacent said fixed electrodes to form a gap between said fixed electrodes and said conductive film.

27. The method according to claim 24, wherein said step of forming pressure sensing electrostatic capacitances comprises:

forming fixed electrodes in a surface of said substrate;

forming an insulator film on said surface of said substrate, including said fixed electrodes, forming a conductive film on said insulator film; and selectively removing said insulator film in areas adjacent said fixed electrodes to form a gap between said fixed electrodes and said conductive film.

* * * * *